United States Patent [19]

Sekizawa et al.

[11] Patent Number: 4,992,852

[45] Date of Patent: Feb. 12, 1991

[54] CIRCUIT WITH A COMB FILTER FOR CAUSING COLOR DIFFERENCE SIGNALS TO COINCIDE ON EACH SCANNING LINE

[75] Inventors: Ikuhisa Sekizawa; Kazuo Okada, both of Tokyo, Japan

[73] Assignee: Fuji Photo Film Co., Ltd., Tokyo, Japan

[21] Appl. No.: 258,145

[22] Filed: Oct. 3, 1988

[30] Foreign Application Priority Data

Oct. 3, 1987 [JP] Japan ................................ 62-249110

[51] Int. Cl.$^5$ .......................................... H04N 11/22
[52] U.S. Cl. ..................................................... 358/11
[58] Field of Search .......................................... 358/11

[56] References Cited

FOREIGN PATENT DOCUMENTS

| 134588 | 7/1985 | Japan | 358/11 |
| 187489 | 8/1986 | Japan | 358/11 |
| 2126832 | 3/1984 | United Kingdom | 358/11 |

*Primary Examiner*—John W. Shepperd

[57] ABSTRACT

A circuit for producing a chroma signal which includes both of a first and a second color difference signal on each of scanning lines in response to a line-sequential color difference signal in which a first and a second color difference signal appear alternately on consecutive scanning lines. A carrier generator generates a first and a second color subcarrier which are different in phase from each other in synchronism with the line-sequential color difference signal. The first color subcarrier is subjected to balanced modulation at a first modulator which uses the first color difference signal for the modulation while the second color subcarrier is subjected to balanced modulation at a second modulator which uses the second color difference signal. The outputs of the first and second modulators are added together by a first adder. A delay circuit is provided for delaying an output of the first adder by a period of time which is substantially equal to one horizontal scanning period. The output of the delay circuit is added to the output of the first adder by a second adder to produce the chroma signal. The circuit eliminates the need for operations heretofore performed for bringing color difference signals into coincidence at the baseband and thereby the need for delay circuits, switching circuits and adjusting circuits which implement such operations.

8 Claims, 8 Drawing Sheets

CIRCUIT WITH A COMB FILTER FOR CAUSING COLOR DIFFERENCE SIGNALS TO COINCIDE ON EACH SCANNING LINE

BACKGROUND OF THE INVENTION

1. Field of the Invention

The present invention relates to a color encoder for coding a color video signal and, more particularly, to a circuit with a comb filter for causing different kinds of color difference signals of a line-sequential color difference signal sequence to coincide on each scanning line to produce a composite color video signal.

2. Description of the Prior Art

In an electronic still camera system or similar imaging system, a color video signal is usually recorded on a floppy video disk by adopting a color difference line-sequential system. When such a signal is to be read out of a floppy video disk to produce a composite color video signal which is prescribed by a standard color television system, for example, two different kinds of color difference signals which appear line-sequentially and alternately with each other are so arranged as to coincide on each of consecutive scanning lines by a special procedure. This procedure for the line-by-line coincidence of color difference signals has heretofore been implemented by supplementing a scanning line which lacks one of the two kinds of color difference signals with a color difference signal of the same kind that appeared on the immediately preceding scanning line.

A prior art circuit for effecting the supplement mentioned above includes a delay circuit for delaying color difference signals of a line-sequential signal sequence by one horizontal scanning (1H) period. The delayed color difference signals are individually clamped together with non-delayed color difference signals and then switched in such a manner that color difference signals of one kind appear on one input terminal of an encoder and those of the other kind appear on the other input terminal of the same without exception. The encoder applies balanced modulation to color subcarriers by using the color difference signals which are now coincident with each other on a line basis. The color subcarriers, or color difference signals, that have undergone balanced modulation are routed through a comb filter to a mixer to be combined with a luminance signal, whereby a composite video signal is produced. The comb filter is also implemented by a 1H delay circuit for enhancing the signal-to-noise (S/N) ratio of the color difference signals. Since the color difference signals are delayed by 1H as stated above, the luminance signal has to be delayed by 1H by an exclusive 1H delay circuit so that its time axis may coincide with that of the color difference signals.

As described above, the prior art circuit for the coincidence of color difference signals needs three 1H delay circuits. Moreover, since a line-sequential color difference signal sequence has a narrow frequency band, the delay circuit adapted for the coincidence of two kinds of color difference signals has to be implemented as a charge-coupled device (CCD) delay circuit. A drawback with a CCD delay circuit is that the scattering of transfer charge level particular thereto has to be compensated for by accurately adjusting line by line the levels of the signals which are coincident with each other. Thus, the prior art circuit is complicated in construction and needs adjustment which is troublesome.

SUMMARY OF THE INVENTION

It is therefore an object of the present invention to provide a circuit for the coincident of color difference signals of line-sequential color difference signal sequence which is simple in construction and is easily adjustable.

In accordance with the present invention, there is provided a circuit for producing a chroma signal which includes both of a first and a second color difference signal on every scanning line in response to a line-sequential color difference signal sequence in which a first and a second color difference signal appear alternately on consecutive scanning lines. A carrier generating section generates a first and a second color subcarrier which are different in phase from each other in synchronism with the color difference signals of the line-sequential color difference signal sequence. The first color subcarrier is subjected to balanced modulation at a first modulator which uses the first color difference signal for the modulation while the second color subcarrier is subjected to balanced modulation at a second modulator which uses the second color difference signal. The outputs of the first and second modulators are added together by a first adder. A delay circuit is provided for delaying an output of the first adder by a period of time which is substantially equal to one horizontal scanning period. The output of the delay circuit is added to the output of the first adder by a second adder to produce the chroma signal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
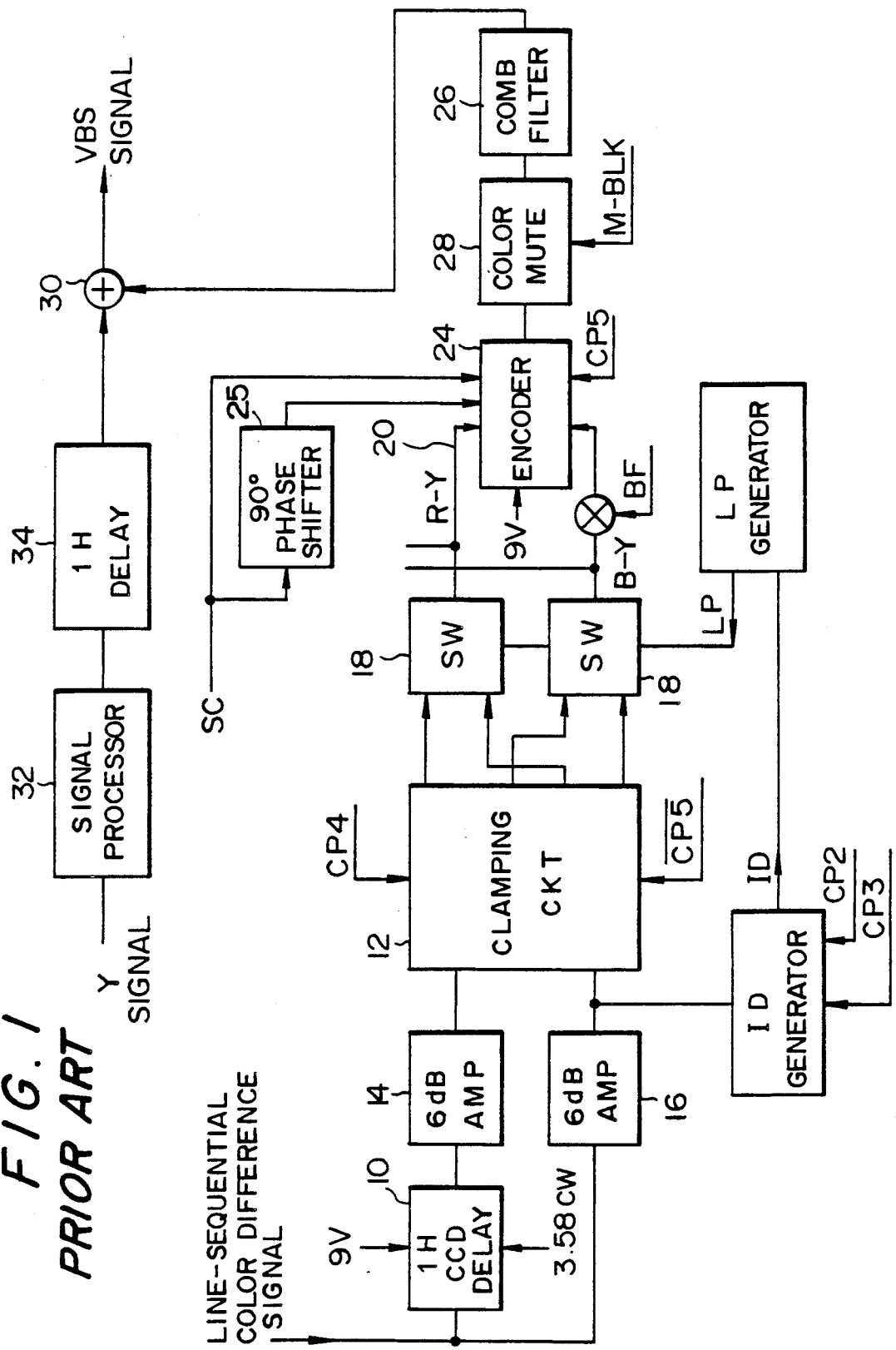
FIG. 1 is a schematic block diagram showing a prior art circuit for causing different kinds of color difference signals of a line-sequential color difference signal sequence to coincide on every scanning line.

To better understand the present invention, a brief reference will be made to a prior art circuit for the line-by-line coincidence of color difference signals of a line-sequenctial color difference sequence, shown in FIG. 1. As shown, the circuit includes a one-horizontal-scanning-period (1H) delay circuit 10 and a clamp circuit 12 to which the 1H delay circuit 10 is connected via a 6 dB amplifier 14. An incoming line-sequential color difference signal sequence is applied on one hand to the 1H delay circuit 10 and on the other hand to another 6 dB amplifier 16 bypassing the delay circuit 10. An 1H-delayed output of the 1H delay circuit 10 is fed to the clamp circuit 12 via the 6 dB amplifier 14 together with the output of the 6 dB amplifier 16 which is not delayed. Switches 18 are operated such that color difference signals of the same kind appear on the same terminal. Specifically, color difference signals R-Y and B-Y outputted by the clamp circuit 12 are respectively applied to input terminals 20 and 22 of an encoder 24 via the switch circuits 18.

Color subcarriers which are 90 degrees different in phase from each other are fed to the encoder 24 directly and via a 90-degree phase shiter 25. The encoder 24 applies balanced modulation to the color subcarriers by using the input color difference signals which are now coincident with each other on a line basis. An output of the encoder 24 is routed to a comb filter 26 via a color muting circuit 28 so that noise components contained therein are cancelled. The color difference signal filtered by the comb filter 26 is fed to a mixer 30 to be combined with a luminance signal, or Y signal, which is applied to the mixer 30 via a signal processor 32 and a 1H delay circuit 34. The output of the mixer 30 is fed out in the form of as a composite video signal VBS.

The comb filter 26 includes a 1H delay circuit which functions to enhance the signal-to-noise (S/N) ratio by delaying the input color difference signal by 1H and determining a difference between the delayed signal and the non-delayed or orginal signal. Since color difference signals applied to the color difference signal processing line are delayed by 1H as stated above, a luminance signal or Y signal has to be delayed by 1H also so that it may be matched to the color difference signals with respect to time axis. Otherwise, colors would appear deviated from each other in a reproduced picture in the vertical direction of a screen. For this reason, the delay circuit 34 is provided in the Y signal processing line.

As shown and described, the prior art circuitry needs as many as three 1H delay circuits. The 1H delay circuit included in the comb filter 26 may be comprised of a glass delay line. Since a line-sequential color difference signal sequence has a narrow frequency band, the 1H delay circuit 10 is implemented by charge coupled devices (CCDs). A drawback with the use of a CCD type delay circuit is that due to the scattering of transfer charge level the levels of signals which are coincident on each line have to be adjusted line by line under strict conditions. The prior art circuitry, therefore, requires a complicated construction as well as complicated adjustment, as previously discussed.

Figure 2:
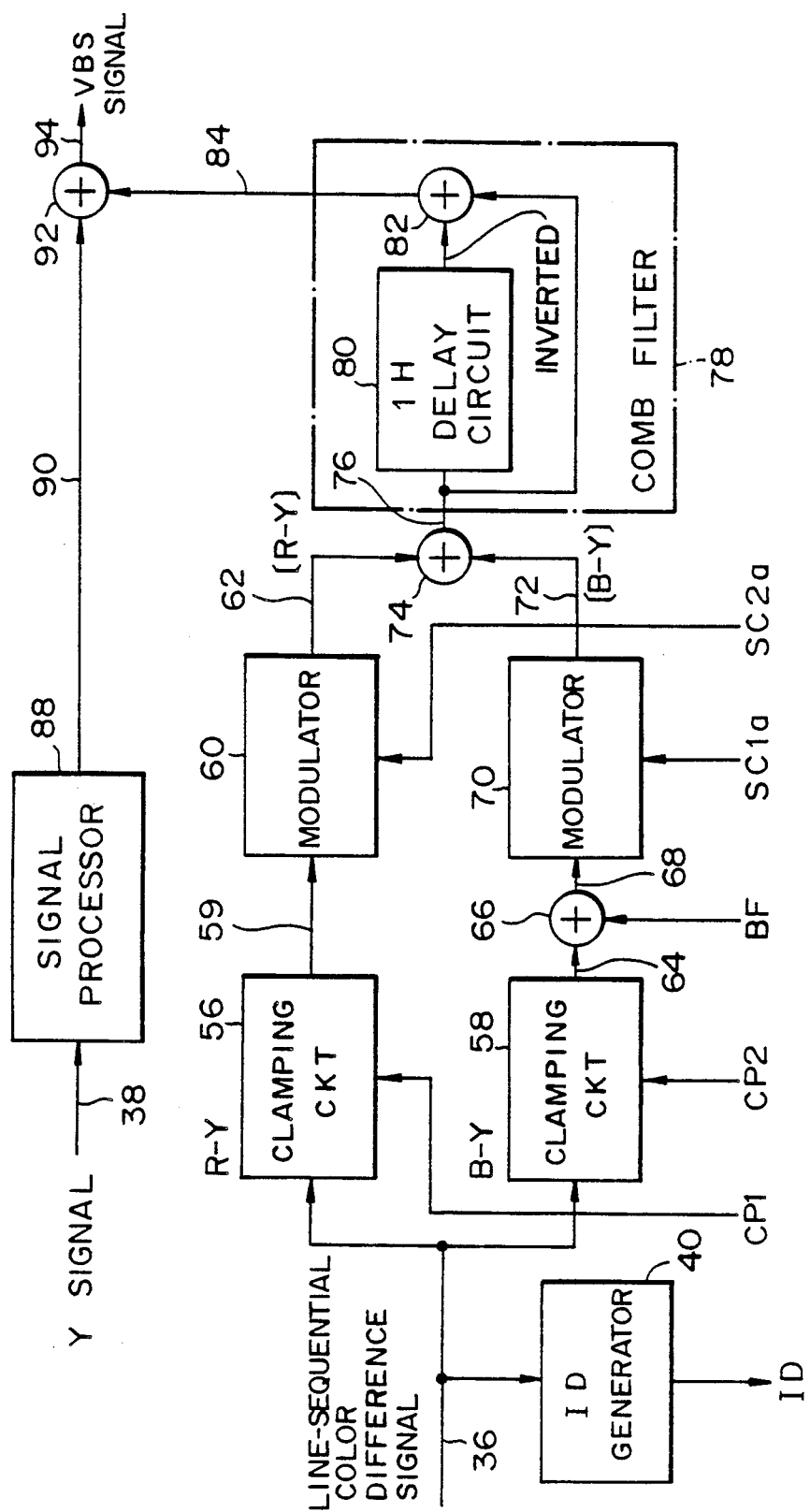
FIGS. 2 and 3 are block diagrams schematically showing a circuit for the coincidence of color difference signals embodying the present invention.
Figure 3:
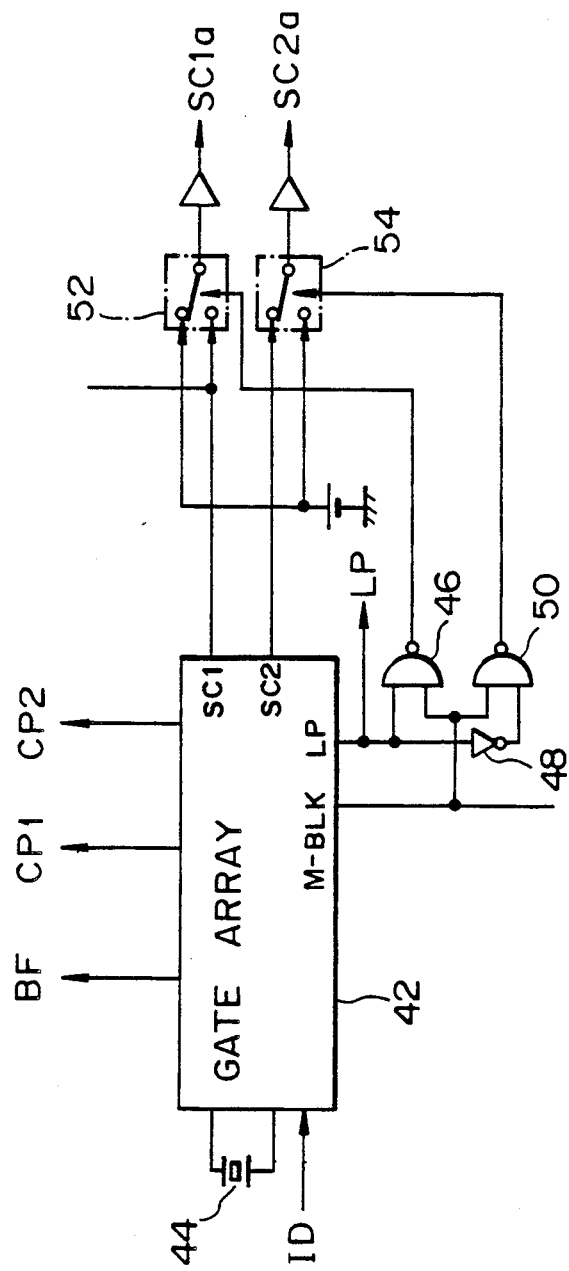

Referring to FIGS. 2 and 3, a circuit embodying the present invention is shown which omits a CCD type delay circuit by not performing the operation for the coincidence of different kinds of color difference signals at the baseband. Briefly, the circuit shown in FIGS. 2 and 3 are constructed such that line pulses LP are produced in response to an ID signal which is adapted to identify two different kinds of color difference signals R-Y and B-Y in distinction from each other. Color subcarriers SC1a and SC2a the phases of which differ from each other and alternate with each other at each 1H period are individually modulated with the color difference signals R-Y and B-Y. The modulated color subcarriers SC1a and SC2a are added together to produce a chroma signal in which the different color difference signals appear on each scanning line at the same time.

Figure 6:
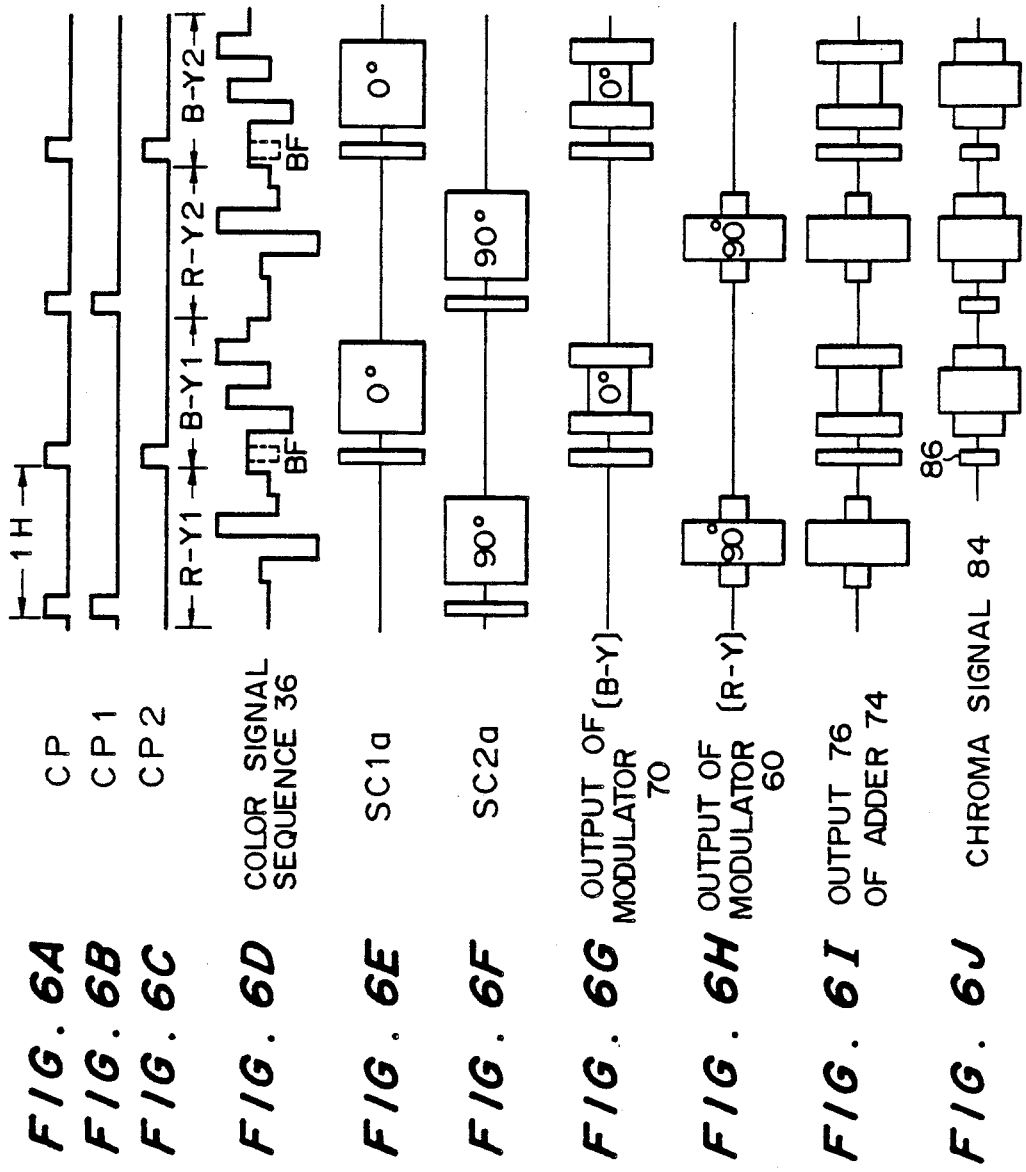
FIGS. 6A to 6J are schematic diagrams showing the waveforms of signals which appear in various portions of any of the embodiments of the present invention.
Figure 8:
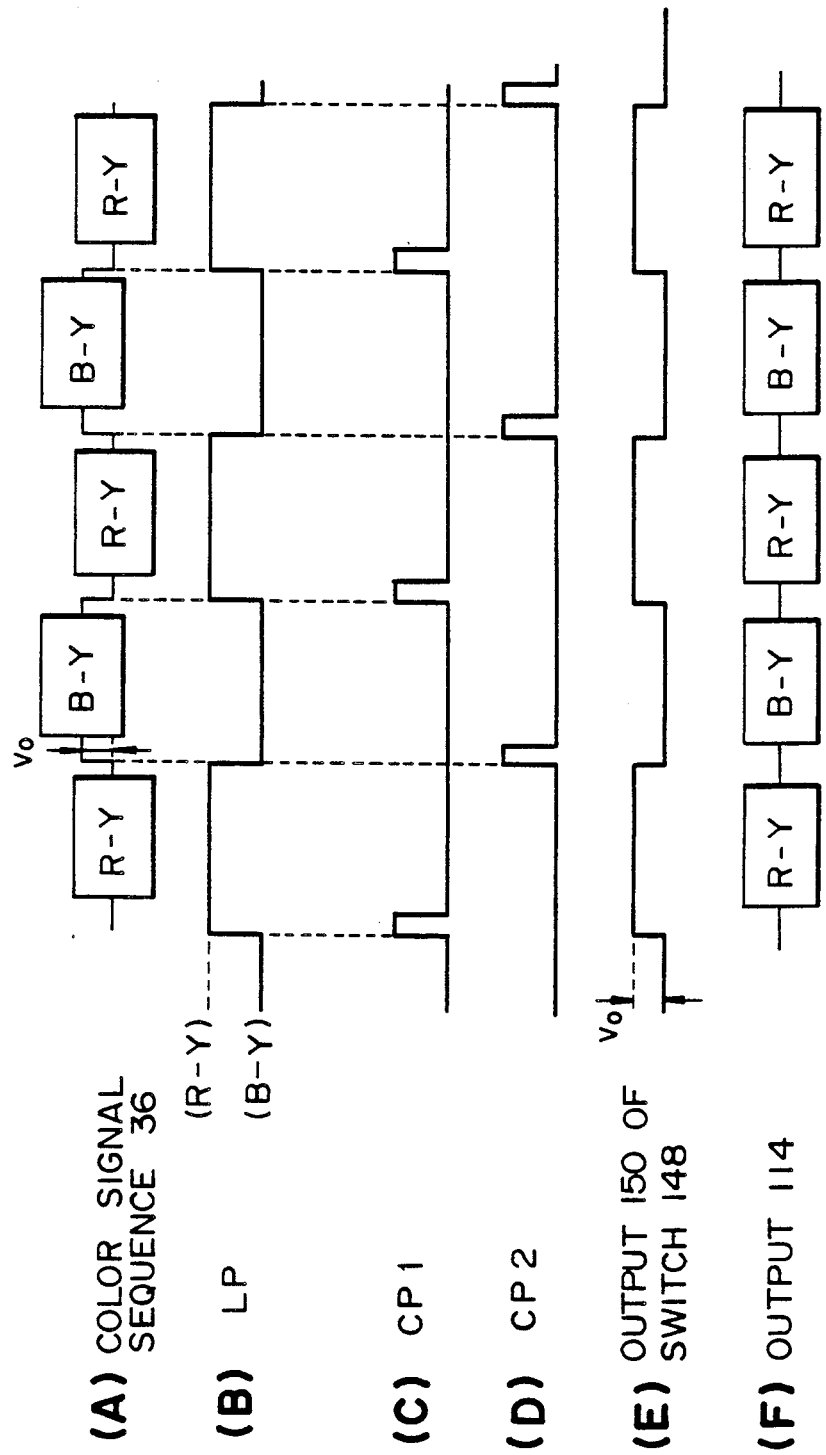
FIG. 8 is a diagram schematically showing the waveforms of signals which appear in the level difference killer section of FIG. 7.

For example, on a floppy video disk applicable to an electronic camera system which is known in the imaging art, a color video signal is recorded after being subjected to frequency modulation. The color video signal read out of such a floppy disk is demodulated to produce a luminance signal or Y signal and a line-sequential color difference signal sequence. In the circuit of FIG. 2, the color difference signal sequence and the Y signal are applied to input terminals 36 and 38, respectively. Specifically, as shown in FIG. 6C, the line-sequential color difference signal sequence is composed of two kinds of color difference signals R-Y and B-Y which appear alternately with each other at each 1H period. The color difference signals R-Y and B-Y are each stored in a floppy video disk at a different carrier frequency, e.g., at 1, 2 megahertz and 1.3 megahertz, respectively. Hence, when the color difference signals R-Y and B-Y are demodulated, they are different in pedestal potential by a predetermined voltage of $v_o$ from each other, as shown in FIG. 8, line (A). Receiving the color difference signals, an identification (ID) generator 40 generates an ID signal for identifying the color difference signals R-Y and B-Y. The ID signal from the ID generator 40 is applied to a gate array 42, FIG. 3.

As shown in FIG. 3, the gate array 42 includes an oscillator 44 which oscillates a stable reference frequency. In response to the ID signal and other synchronizing signals, the gate array 42 generates various kinds of timing signals. Timing signals which are associated with color difference signals, for example, include a burst flag BF, clamp pulses CP1 and CP2, line pulses LP, color subcarriers SC1 and SC2, and mute blanking pulses M·BLK.

The burst flags BF are used to define when color bursts are superposed, and appear at particular timings as indicated by dotted lines in FIG. 6D. The clamp pulses CP1 and CP2 are produced to define when the line-sequential color difference signal sequence is clamped which comes in through the input terminal 36. Specifically, as shown in FIGS. 6B and 6C, the clamp pulses CP1 and CP2 appear in synchronism with the color difference signals R-Y and B-Y, respectively. Each of the color subcarriers SC1 and SC2 is a carrier having a frequency of 3.58 megahertz. In the illustrative embodiment, the signals SC1a and SC2a are different in phase from the B-Y axis of a color difference signal color vector by 0 degree and 90 degrees, respectively. The mute blanking pulses M.BLK serve to define when a video signal is muted during vertical and horizontal blanking periods.

The line pulses LP are applied to one input terminal of a NAND gate 46 and, via an inverter 48, to one input terminal of a NAND gate 50. The mute blanking pulses M.BLK are applied to the other input terminals of the NAND gates 46 and 50. The outputs of the NAND gates 46 and 50 are interconnected to switches 52 and 54, respectively. The switches 52 and 54 are therefore operated to switch the color subcarriers SC1 and SC2 alternately at each 1H period. Consequently, as shown in FIGS. 6E and 6F, two different color subcarriers SC1a and SC2a which are different in phase are delivered alternately with each other at each 1H period.

The line-sequential color difference signal sequence coming in through the input terminal 36 is applied to clamping circuits 56 and 58 and clamped thereby in synchronism with the clamp pulses CP1 and CP2 which are fed thereto from the gate array 42. The output 59 of the clamp circuit 56 is interconnected to one input terminal of a modulator 60 while the color subcarrier SC2a is applied to the other input terminal of the modulator 60. The modulator 60 is implemented with a balanced modulator for modulating the color subcarrier SC2a with the output 59 of the clamping circuit 56, the modulated signal appearing on an output 62 of the modulator 60. The waveform of such a modulated signal is shown in FIG. 6H. On the other hand, the output 64 of the other clamping circuit 58 is fed to an adder 66 which then superposes a burst flag BF on the input signal 64. An output 68 of the adder 66 is fed to a modulator 70. The modulator 70, like the modulator 60, is implemented by a balanced modulator and modulates the color subcarrier SC1a with the output 68 of the adder 66, i.e. color difference signal B-Y. An output 68 of the modulator 70 is shown in FIG. 6G. It will therefore be seen that a color burst is superposed only on the B-Y color difference signal which is associated with the burst flag BF.

The outputs 62 and 72 of the balanced modulators 60 and 70, respectively, are added by an adder 74 and then applied to an input terminal 76 of a comb filter 78. In this particular embodiment, the output 76 of the adder 74 has such a waveform as one shown in FIG. 6I.

As shown in FIG. 2, the comb filter 78 is constituted by a 1H delay circuit 80 and an adder 82. The output 76 of the adder 74 is interconnected on one hand to the inverted output of the 1H delay circuit 80 and on the other hand to the adder 82 bypassing the delay circuit 80. The adder 82 adds on a pixel basis the current chroma signal which is the output 76 of the adder 74 to the chroma signal appearing 1H before and outputted by the 1H delay circuit 80. Therefore, a composite chroma signal appearing on the output 84 of the comb filter 78 is such that the B-Y and R-Y vectors are combined on each scanning line with respect to the vector coordinates of color difference signals. More specifically, the signal appearing on the output 84 of the comb filter 78 has been modulated with the two different color difference signals R-Y and B-Y line by line, i.e., the color difference signals of the line-sequential signal sequence are included in each of the scanning lines. The composite chroma signal 84 outputted by the comb filter 78 has a waveform which is shown in FIG. 6J. It is to be noted that the color bursts 86 of the composite chroma signal 84 have an amplitude which is one half the amplitude of those of the signal 76.

On the other hand, the luminance signal or Y signal applied to the input terminal 38 is fed to a signal processor 88 and therefrom to one input terminal 90 of a mixer 92. Applied to the other input terminal of the mixer 92 is the output 84 of the comb filter 78, i.e. chroma signal. Mixing the Y signal with the chroma signal, the mixer 92 produces a composite video signal VBS and delivers it to an output terminal 94.

As stated above, paying attention to the fact that a prior art circuit for the line-by-line coincidence of different color signals includes a comb filter with a delay circuit, the embodiment of FIGS. 2 and 3 modulates each of two color carriers SC1a and SC2a which are different in phase and alternate with each other at each 1 H period with a respective one of two different color difference signals B-Y and R-Y, and adds the modulated color carriers SC1a and SC2a by the comb filter 78 to produce a chroma signal. That is, the illustrative embodiment omits the operation heretofore performed for the coincidence of different color signals at the baseband and thereby elimintates the need for a CCD type delay circuit necessary for such an operation. This simplifies the circuit construction and makes various kinds of troublesome adjustment such as line-by-line CCD level adjustment needless. While a prior art system is not operable without resorting to an exclusive switcher for color muting, the embodiment shown and described does not need such a switcher, i.e., it is capable of loading a chroma signal with color bursts by the superposition of color subcarriers which is effected by the buffer flags BF during the process for establishing coincidence.

Figure 4:
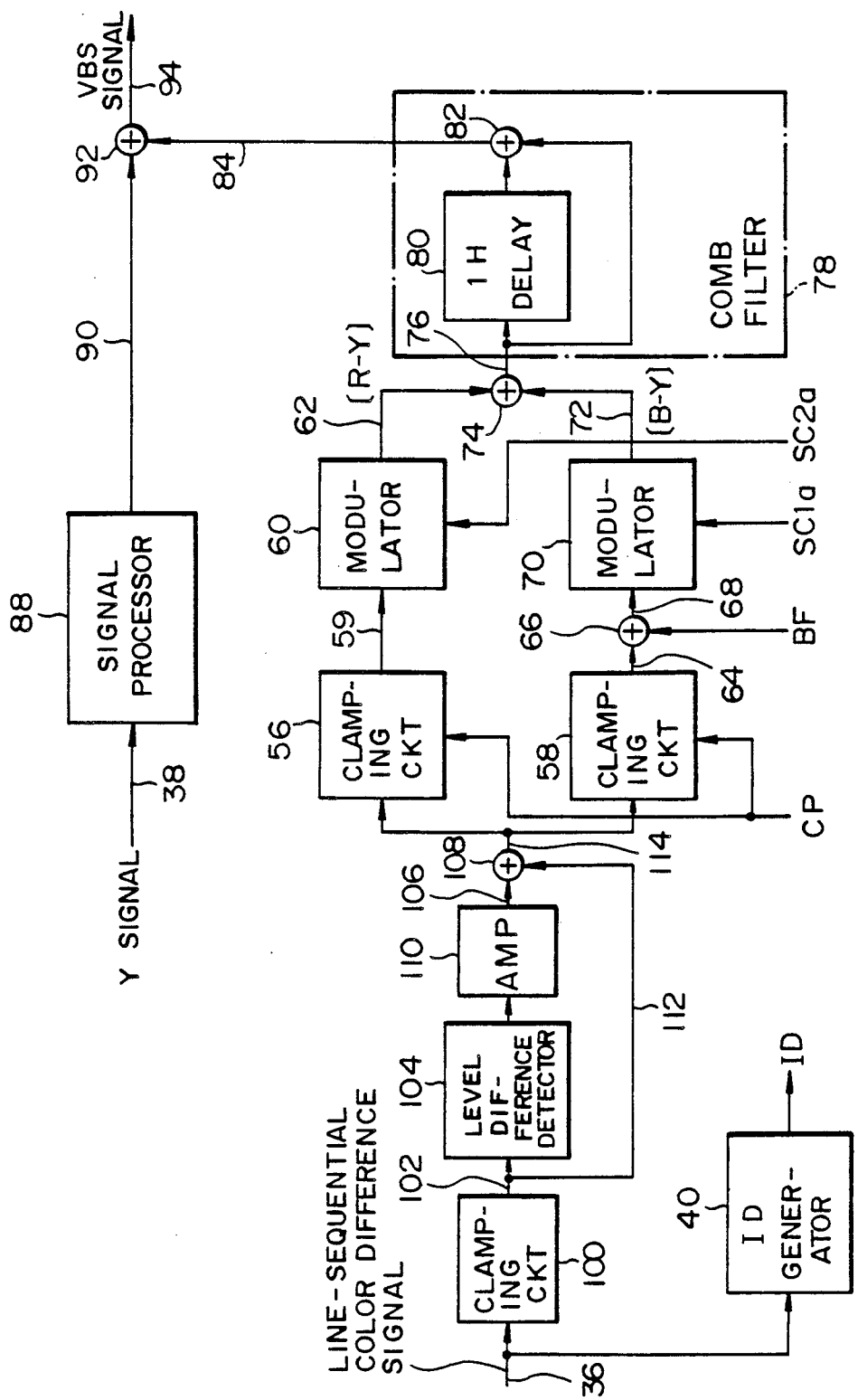
FIGS. 4 and 5 are views similar to FIGS. 2 and 3, respectively, showing another embodiment of the circuit in accordance with the present invention.
Figure 5:
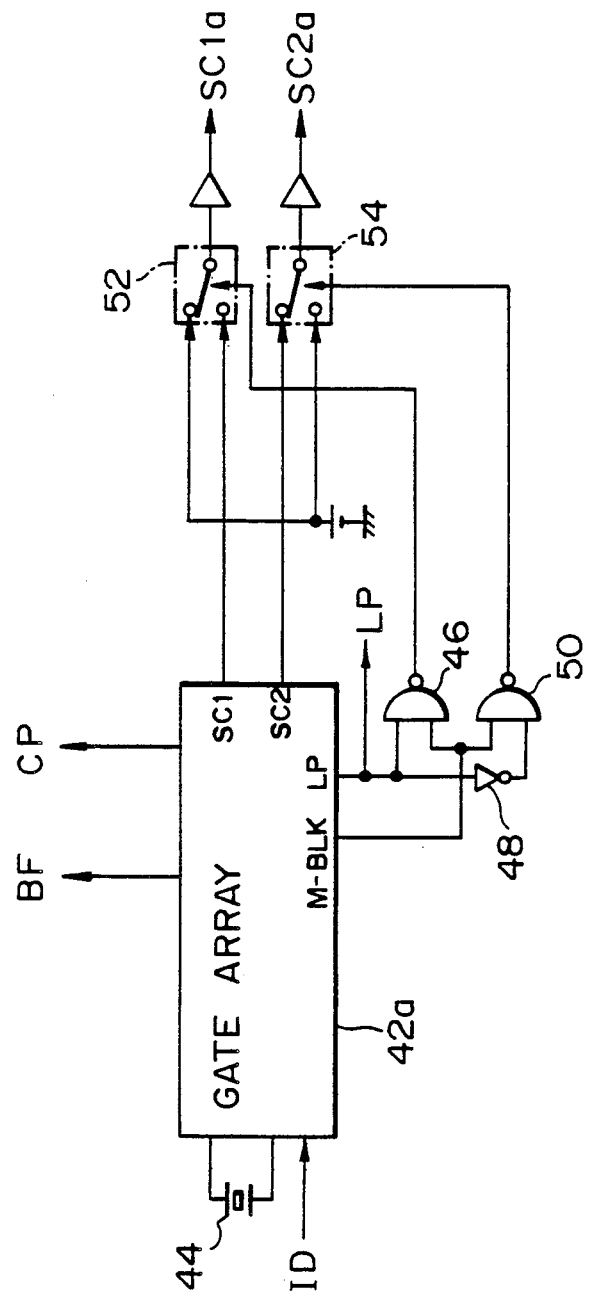

Referring to FIGS. 4 and 5, another embodiment of the circuit for the coincidence of color difference signals in accordance with the present invention is shown. This alternative embodiment differs from the embodiment of FIGS. 2 and 3 in that the former uses only one kind of clamp pulses CP. Specifically, a gate array 42a shown in FIG. 5 produces a single kind of clamp pulses CP in place of the two different kinds of clamp pulses CP1 and CP2 which are generated by the gate array 42 of FIG. 3. In FIGS. 4 and 5, the same or similar structural elements as those shown in FIGS. 2 and 3 are designated by like reference numerals, and details thereof will not be described to avoid redundancy.

As shown in FIG. 4, the circuit includes a clamp circuit 100 and the ID generator 40 each of which is connected to the input terminal 36. The output terminal 102 of the clamp circuit 100 is connected to a level difference detector 104 the output terminal of which is in turn connected to one input terminal 106 of an adder 108 via an amplifier 110. The output terminal 102 of the clamp circuit 100 is connected to the other input terminal 112 of the adder 108 also, bypassing the level difference detector 104 and amplifier 110. The level difference detector 104 is responsive to the difference $v_o$ in pedestal potential between the color difference signals R-Y and B-Y, as shown in FIG. 8, line (A). A signal outputted by the level difference detector 104 and representative of the potential difference $v_o$ is inverted and then applied to the amplifier 110. An output 106 of the amplifier 110 is added by the adder 108 to the original signal which is directly fed from the clamp 102 to the adder 108. Consequently, color difference signals appear on an output terminal 114 of the adder 108, as shown in FIG. 8, line (F).

The color difference signals appearing on the output terminal 114 of the adder 108 and having no difference in potential level are fed to the clamp circuits 56 and 58. While the gate array 42a generates a clamp pulse CP at every 1H period, the clamp circuits 56 and 58 individually clamp the input color difference signals at those timings which are defined by the clamp pulses CP. Specifically, the clamp circuits 56 and 58 clamp the color difference signals R-Y and B-Y, respectively. Applied to the modulator 60 is a color subcarrier SC1a which has an amplitude for a period of time that corresponds to the duration of the color difference signal B-Y, as shown in FIG. 6E. As a result, a signal modulated with the color difference signal B-Y appears on the output terminal 62 of the modulator 60. Likewise, a color subcarrier SC2 having an amplitude while the other color difference signal R-Y is present as shown in FIG. 6F is applied to the modulator 70, so that a signal modulated with the color difference signal R-Y appears on the output terminal 72 of the modulator 70. This is followed by the procedure which has been described in relation to the embodiment of FIGS. 2 and 3. In this manner, the object of the present invention is achievable even with a single kind of clamp pulses CP which are shared by the two clamping circuits 56 and 58 to further simplify the circuit arrangement.

Figure 7:
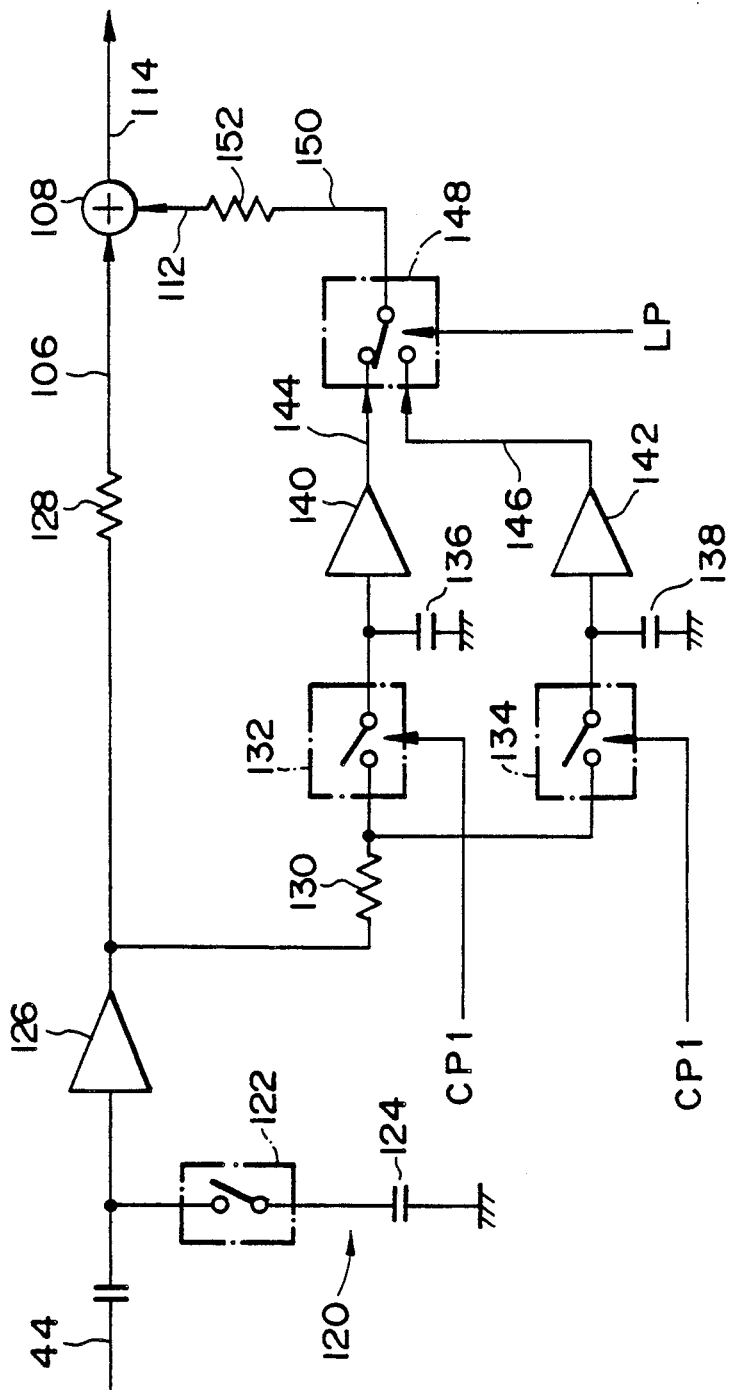
FIG. 7 is a diagram showing a specific construction of a level difference killer section which is applicable to the embodiment of FIGS. 4 and 5.

Referring to FIG. 7, there is shown a specific construction of a level difference killing section which intervenes between the clamp circuit 100 and the adder 108 of FIG. 4. As shown, the level difference killer section is constructed to cancel the level difference $v_o$ between the two different color difference signals R-Y and B-Y by using two different kinds of clamp pulses $CP_1$ and $CP_2$ and line pulses LP. Specifically, the level difference killer includes a clamping circuit 120 which is made up of a clamp switch 122 for clamping the color difference signals which come in through the input terminal 36, and a capacitor 124 connected between the clamp switch 122 and ground. The color difference signals are clamped by the clamping circuit 120 at predetermined timings and then routed through an amplifier 126 and a resistor 128 to one input terminal 106 of the adder 108 and also routed through a resistor 130 to switches 132 and 134.

The switches 132 and 134 are closed in response to the clamp pulses CP1 and CP2, respectively. While the switches 132 and 134 are closed, capacitors 136 and 138 associated therewith are individually charged by the color difference signals. Specifically, as shown in FIG. 8, lines (A), (C) and (D), the capacitor 136 samples and holds a voltage which appears at the leading edge of the color difference signal R-Y, i.e., DC level of the intermediate portion of the signal R-Y, and the capacitor 138 samples and holds the DC level of the other color difference signal B-Y.

The capacitors 136 and 138 are respectively connected to amplifiers 140 and 142 which are in turn respectively connected to terminals 144 and 146 of a switch 148. The switch 148 serves as a selector which selectively assumes two different states in response to the line pulses LP. As shown in FIG. 8, line (B), the switch 148 couples its output terminal 150 to the input terminal 144 when the color difference signal R-Y appears and couples it to the other input terminal 146 when the color difference signal B-Y appears. The output terminal 150 of the switch 148 is connected to the other input terminal 112 of the adder 108 via a resistor 152. Consequently, a rectangular wave whose pulse width and height are substantially equal to one horizontal scanning period (1H) and the potential difference $V_o$, respectively, appears on the input terminal 112 of the adder 108, as shown in FIG. 8, line (E).

The adder 108 adds the rectangular wave appearing on its input terminal 112 to the color difference signals appearing on the other input terminal 106. As a result, color difference signals which have the same level as shown in FIG. 8, line (F) are produced on the output terminal 114 of the adder 108.

While the gate array 42 of FIG. 3 and the gate array 42a of FIG. 5 are each shown in an integrated circuit configuration, it will be readily understood that the circuit elements 46, 48, 50, 52 and 54 which are associated with each of the gate arrays 42 and 42a may be integrated together with the latter.

Turning back to FIG. 1, the prior art circuit necessarily includes a CCD type delay circuit in both of its color difference signal processing line and luminance signal processing line. The embodiments of the present invention shown and described do not need a CCD type delay circuit in the luminance signal processing line because the color difference signals are delayed by not more than 1H each. While a CCD type delay circuit needs those elements which are operable over a wide frequency band, a delay circuit operable over a wide range and, especially, driven by low voltage consumes substantial power. In any of the embodiments of the present invention which are void of the CCD delay circuits 10 and 34, the delay circuit 80 of the comb filter 78 may be implemented by a glass delay element to cut down the power consumption of the whole apparatus. In such a case, the apparatus may even be powered by a battery.

In summary, in accordance with the present invention, color carriers which are different in phase and alternate with each other are individually modulated by different kinds of color difference signals, and the resulting signals are added together by a comb filter to produce a chroma signal. This omits the procedure heretofore performed at the baseband for the coincidence of color difference signals on every scanning line and thereby eliminates the need for a CCD type delay circuit. A CCD type delay circuit inherently suffers from charge transfer losses and brings about a difference in temperature dependency between a delayed signal and a non-delayed signal. There is also omitted an exclusive switching circuit otherwise assigned to the above-stated operation which is performed at the baseband, so that the offset of a video signal ascribable to the parasitic capacity of the switching circuit is precluded.

The transfer losses, difference in temperature dependency and offset due to parasitic capacity mentioned above would cause color flickers in a reproduced picture owing to the level difference between a delayed and a non-delayed signal. The present invention is free from such flickers and therefore does not need an exclusive adjusting circuit otherwise used to compensate for the flickers. In addition, the system of the present invention requires no extra and complicated circuits because it makes use of a comb filter which exists in a prior art system.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A circuit for producing a chroma signal which includes both a first and a second color difference signal on each scanning line in response to a line-sequential color difference signal in which a first and a second color difference signal appear alternately on consecutive scanning lines, comprising:
   carrier generating means for generating a first color subcarrier of a first phase and a second color subcarrier of a second phase, said first and second phase being different from each other and in synchronism with the line-sequential color difference signal;
   first modulator means for applying balanced modulation to the first color subcarrier by using the first color difference signal;
   second modulator means for applying balanced modulation to the second color subcarrier by using the second color difference signal;

first adder means for adding an output of said first modulator means to an output of said second modulator means;

delay means for delaying an output of said first adder means by a period of time which is substantially equal to one horizontal scanning period to produce a resultant, delayed output in a phase opposite to a phase of the output of said first adder means; and second adder means for adding an output of said delay means to the output of said first adder means to produce the chroma signal.

2. A circuit in accordance with claim 1, wherein said carrier generating means further comprises:

identifying means for receiving the line-sequential color difference signal and identifying the first and second color difference signals in distinction from each other;

reference oscillator means for oscillating a reference frequency signal;

a gate array for producing from the reference frequency signal the first and second subcarriers which are substantially 90 degrees different in phase from each other; and switch means for feeding the first color subcarrier produced by said gate array to said first modulator means for a horizontal scanning period during which said identifying means identifies the first color difference signal, and feeding the second color subcarrier to said second modulator means for a horizontal scanning period during which said identifying means identifies the second color difference signal.

3. A circuit in accordance with claim 1, further comprising:

first clamping means for receiving the line-sequential color difference signal and clamping the first color difference signal to feed the clamped first color difference signal to said first modulator means; and second clamping means for receiving the line-sequential color difference signal and clamping the second color difference signal to feed the clamped second color difference siganl to said second modulator means.

4. A circuit in accordance with claim 1, wherein the first and second color difference signals are different in DC level from each other, said circuit further comprising:

level difference killing means operative in response to the line-sequential color difference signal for producing the color difference signals which are not different in DC level; and clamping means for clamping the color difference signals of the line-sequential color difference signal which are not different in DC level and feeding the clamped color difference signals to said first modulator means and said second modulator means;

said first modulator means and said second modulator means applying balanced modulation to the first and second color subcarriers, respectively, by using the clamped color difference signals.

5. A circuit in accordance with claim 1, further comprising third adder means for adding the chroma signal outputted by said second adder means to a luminance signal which is associated with the line-sequential color difference signal to produce a composite color video signal.

6. A circuit in accordance with claim 1, wherein said second modulator means comprises means for introducing the second color subcarrier in the form of color bursts.

7. A circuit in accordance with claim 1, wherein said delay means comprises a glass delay element interconnected to said first adder means for delaying the output of said first adder means to provide said second adder means with the resultant, delayed output.

8. The circuit of claim 7, wherein said glass delay element is a circuit.

* * * * *